United States Patent [19]

French

[11] 4,199,760
[45] Apr. 22, 1980

[54] METHOD FOR MEASURING RANGE TO A ROCKET IN FLIGHT EMPLOYING A PASSIVE GROUND TRACKER STATION

[75] Inventor: John A. French, Huntsville, Ala.

[73] Assignee: The United States of America as represented by the Secretary of the Army, Washington, D.C.

[21] Appl. No.: 942,721

[22] Filed: Sep. 15, 1978

[51] Int. Cl.² ........................................... G01S 11/00
[52] U.S. Cl. ............................................... 343/112 D
[58] Field of Search ................................... 343/112 D

[56] References Cited

U.S. PATENT DOCUMENTS

| 2,924,820 | 2/1960 | Dishal et al. | 343/112 D X |
| 3,339,202 | 8/1967 | Earp | 343/112 D X |
| 3,863,256 | 1/1975 | Smith | 343/112 D X |
| 3,916,410 | 10/1975 | Elwood | 343/112 D |

Primary Examiner—T. H. Tubbesing
Attorney, Agent, or Firm—Nathan Edelberg; Robert P. Gibson; Robert C. Sims

[57] ABSTRACT

A passive radio frequency (rf) sensor is used to track the beacon of a ballistic nonguided rocket. Azimuth and elevation data are obtained in conventional radar fashion, but range data is obtained by range tracking the beacon pulse which is timed by a precision crystal controlled clock.

2 Claims, 2 Drawing Figures

METHOD FOR MEASURING RANGE TO A ROCKET IN FLIGHT EMPLOYING A PASSIVE GROUND TRACKER STATION

DEDICATORY CLAUSE

The invention described herein may be manufactured, used, and licensed by or for the Government for governmental purposes without the payment to me of any royalties thereon.

BACKGROUND OF THE INVENTION

Artillery rockets that are unguided are known to have large dispersion in flight, resulting in reduced military effectiveness. This dispersion is generally attributable to a launch-and-boost phase bias and random effects such as upper atmospheric or end game winds. The bias is compensated in some systems (generally referred to as "corrected launch rocket systems") by sensing the trajectory of the first launched rocket, comparing the actual trajectory with the desired trajectory and adjusting the launcher aiming for successive rounds. The trajectory sensing is normally implemented by radar tracking of a triggered beacon in the first rocket. Successive rockets need no beacon. One problem with the present approach is that high-power radiations from the tracking radar give away the location of the rocket artillery battery to the enemy. Further, there are the operational, logistic, and cost considerations associated with a radar transmitter. Another consideration is the jamming possibility introduced by requiring the radar to trigger the beacon through a receiver onboard the rocket. It is therefore concluded that an improvement to the tracking concept that eliminates the need for transmitting to the rocket and triggering a beacon in the rocket will be more operationally effective, less costly, and less vulnerable to electronic countermeasures and counterfire.

It is the objective of this invention to provide a technique of passive microwave three-dimensional tracking of a rocket with a high degree of accuracy, with low ECM vulnerability, with improved cost and general tactical utility.

SUMMARY OF THE INVENTION

The present invention is directed to the method of and apparatus for transmitting a succession of accurately timed pulses to radiate from a rocket which will permit accurate range, azimuth and elevation tracking of the rocket by a passive ground station.

A crystal oscillator or other precision timing device is located aboard the rocket with a similar or identical counterpart installed in the ground station for a time reference. The crystal frequency is divided down to a useful numerical value which is used to trigger a microwave pulse transmitter aboard the rocket, or a timer circuit in the ground station. A ground based microwave tracker receives the pulses and angle tracks the rocket-borne transmitter in a conventional fashion. The received pulses are compared in time with the ground-reference timer generated pulses. Since both timers are functionally identical, a change in the slant range to the rocket will be observed as a change in the time delay between the ground reference timing pulses and the pulses received from the rocket. An accurate measurement of the delay can be translated to an accurate measurement of the range of the rocket by the conventional equation involving the velocity of electromagnetic propagation through the atmosphere. The rocket range thus determined is applied in a conventional fashion along with rocket azimuth and elevation to compute launcher corrections for successive rockets

DESCRIPTION OF THE PREFERRED EMBODIMENT

Figure 1:
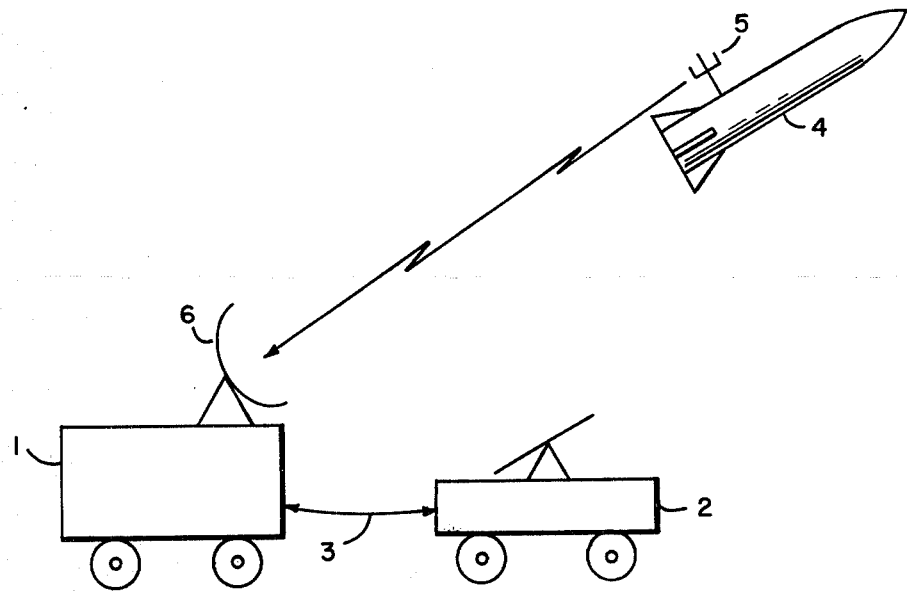
FIG. 1 is a diagrammatic illustration of the preferred embodiment of the invention.
Figure 2:
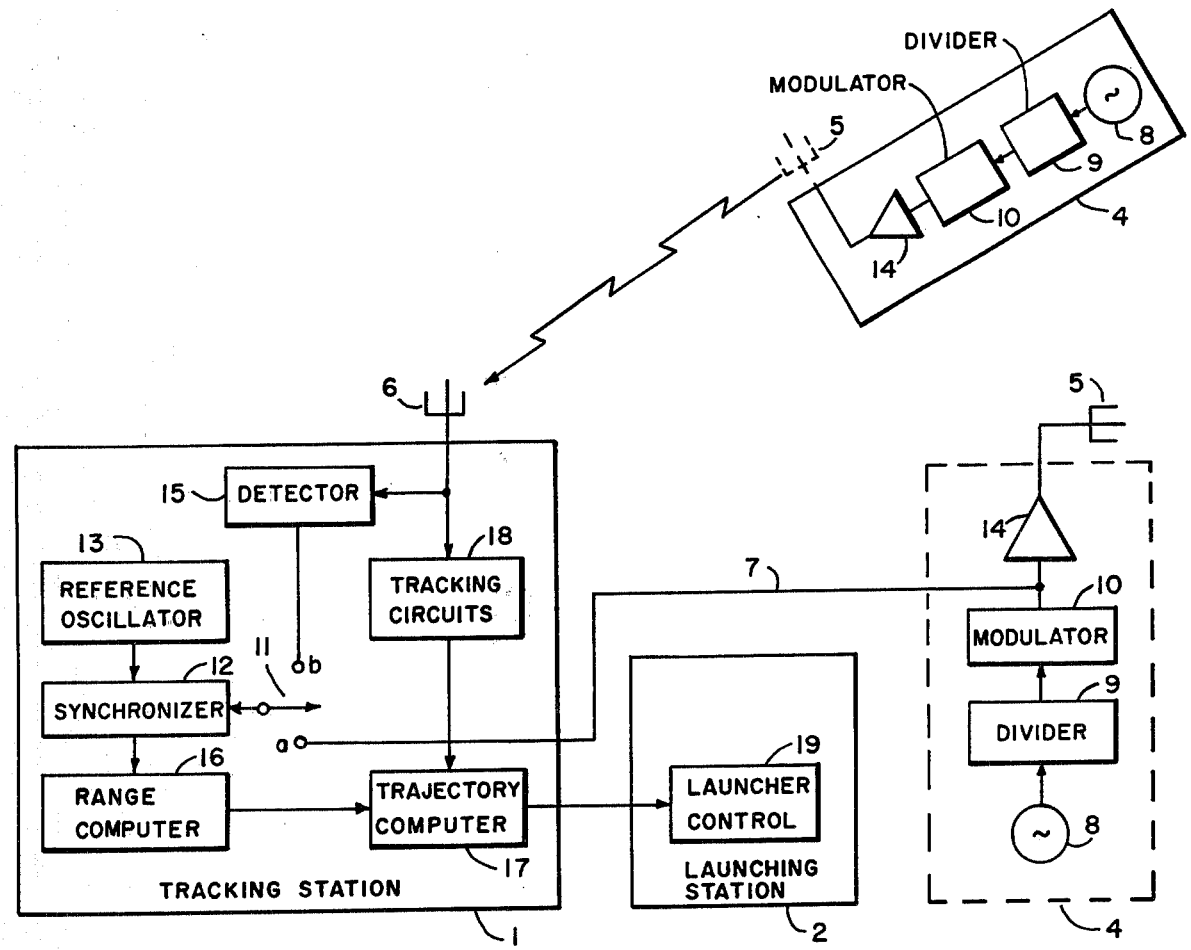
FIG. 2 is a functional block diagram illustration of the preferred embodiment.

FIG. No. 1 is an illustration of the basic pieces of equipment. The tracking station 1 is connected to the launching station 2 by cable 3. The rocket 4 transmits impulses from the antenna 5 to the tracking station antenna 6.

FIG. No. 2 is a block schematic of the circuits contained in the same basic components. Before the rocket 4 is launched, it is connected to the launcher station by umbilical cable 7. The missile's crystal 8 is energized prior to launch and begins to oscillate at a known ratio frequency. Impulses are sent to the divider circuit 9 at very precise intervals, for example, one every millionth of a second with an average error in time of, for example, one part in one hundred million (0.01 PPM). The divider circuit reduces the rate of the crystal impulses by a factor of about 1000 without altering the time variation precision. The signal then is amplified and used to trigger a pulse forming network in the modulator 10. The impulses are now video pulses with a pulse repetition rate of about 1000 per second and a precision of 0.01 PPM. These pulses are sent through the launcher station to the tracking station through switch 11 which is in position a, to the synchronizer 12.

An identical signal is received by the synchronizer from the reference oscillator circuit 13. The synchronizer introduces a time delay to either one of the signals, so that they will be in time coincidence. Monitoring of this operation can serve as a check on the frequency stability of the oscillators, since they should stay in synchronism without the need for altering the adjustment time delay more than about one microsecond every 100 seconds. One synchronism is achieved and the missile launcher is aimed, the missile can be launched. During flight, the modulator 10 triggers the transmitter 14 which transmits a signal via antenna 5 at any suitable frequency in the radio, microwave, visual or other portion of the electromagnetic spectrum, which can be modulated by the aforementioned pulse train. This signal is received by the tracking antenna 6 and demodulated in the detector 15 to produce a signal identical in format to the output of modulator 10 but with a time delay ($\Delta T$) caused by the distance of the transmission path between antennas 5 and 6. With switch 11 now in position b, the synchronizer is used to determined the time difference in pulses received from the missile and from the reference oscillator. Since the time difference is directly proportional to the distance that the missile has moved from the launcher, a "range" computation can be made in the range computer 16 from the equation $$R = C(\Delta t)$$

where:

R is in meters
C is the speed of light or $3 \cdot 10^8$ meters/sec
$\Delta t$ is difference in time between any two pulses when they arrive at the synchronizer, measured in seconds.

The results of the range computation are furnished to the trajectory computer 17 along with the azimuth and elevation data derived in a conventional fashion from the angle tracking circuits 18. The trajectory computer is then able to determine deviations from the desired trajectory and calculate corrections to the launcher setting in a conventional fashion, via launcher controls 19.

Since at no time was there a transmission made from the ground station to the rocket, there is no need for a high powered transmitter to be used by the tracking station. This alleviates the problem of enemy radio frequency devices detecting the location of the ground station. Since there is no receiver on the rocket, there is no possibility that the enemy can electronically jam the circuits of the rocket.

The synchronizer 12 can take the form of any of several well known synchronizers. Further the synchronizer 12 could be a phase detector having an output proportional to the differences in the phase input from reference oscillator 13 and the missile signal input from switch 11. The range of the rocket can be determined by comparing the phase difference obtained before missile launching with the phase difference obtained after missile launching.

I claim:

1. A method of determining the range of a vehicle in relationship to a receiving station comprising the steps of generating identical frequency signals in both the receiving station and the vehicle; comparing these signals prior to the vehicle leaving the receiving station; transmitting the frequency signals generated in the vehicle to said receiving station; determining the range of said vehicle after it has left the receiving station by comparing the difference in the time of arrival of the signal from said vehicle as received by said receiving station with the receiving station generated frequency signal; syncronizing the two frequency signals prior to the vehicle leaving said receiving station; sensing the azimuth and elevation of said vehicle; combining this information with the range information; and using the range, azimuth and elevation to determine the precise trajectory of the vehicle.

2. A method as set forth in claim 1 further providing the steps of modifying the frequency of the signal generated by the vehicle prior to transmitting it to the receiving station; and changing the signal received by the receiving station back to the original frequency generated by the vehicle.

* * * * *